US010908726B2

(12) United States Patent
Wang et al.

(10) Patent No.: US 10,908,726 B2
(45) Date of Patent: Feb. 2, 2021

(54) FORCE TOUCH DEVICE, FORCE TOUCH FEEDBACK METHOD, AND TOUCH DISPLAY DEVICE

(71) Applicant: BOE TECHNOLOGY GROUP CO., LTD., Beijing (CN)

(72) Inventors: Wenbo Wang, Beijing (CN); Chien Pang Huang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/607,447

(22) PCT Filed: Apr. 8, 2019

(86) PCT No.: PCT/CN2019/081753
§ 371 (c)(1),
(2) Date: Oct. 23, 2019

(87) PCT Pub. No.: WO2019/196797
PCT Pub. Date: Oct. 17, 2019

(65) Prior Publication Data
US 2020/0142560 A1    May 7, 2020

(30) Foreign Application Priority Data
Apr. 11, 2018    (CN) .......................... 2018 1 0320230

(51) Int. Cl.
*G06F 3/041*    (2006.01)
*G06F 3/01*    (2006.01)
(Continued)

(52) U.S. Cl.
CPC .......... *G06F 3/04144* (2019.05); *G06F 3/016* (2013.01); *G06F 3/044* (2013.01);
(Continued)

(58) Field of Classification Search
CPC ................... G06F 3/0414–04146; G06F 3/044
See application file for complete search history.

(56) References Cited

U.S. PATENT DOCUMENTS

2012/0068965 A1*  3/2012  Wada .................... G06F 3/0414
                                              345/174
2012/0162114 A1*  6/2012  Inoue .................... G06F 3/0414
                                              345/173
(Continued)

FOREIGN PATENT DOCUMENTS

CN        106484294 A    3/2017
CN        106775122 A    5/2017
(Continued)

*Primary Examiner* — Sanjiv D. Patel
(74) *Attorney, Agent, or Firm* — Dilworth & Barrese, LLP.; Michael J. Musella, Esq.

(57) ABSTRACT

A force touch device, a force touch feedback method and a touch display device are provided. The force touch device includes a first region and a second region, and further includes: a force detecting electrode in the first region and the second region; a sensing electrode in the first region; an auxiliary electrode in the second region, and the auxiliary electrode and the sensing electrode are on a same side of the force detecting electrode. The sensing electrode and the force detecting electrode are disposed oppositely and insulated from each other to form a first force sensor, the auxiliary electrode and the force detecting electrode are disposed oppositely and insulated from each other to form a second force sensor, and a distance of the auxiliary electrode from the force detecting electrode is greater than a distance of the sensing electrode from the force detecting electrode.

19 Claims, 7 Drawing Sheets

(51) Int. Cl.
*G06F 3/044* (2006.01)
*G06F 3/045* (2006.01)
(52) U.S. Cl.
CPC .... *G06F 3/045* (2013.01); *G06F 2203/04105* (2013.01); *G06F 2203/04106* (2013.01)

(56) References Cited

U.S. PATENT DOCUMENTS

| | | | |
|---|---|---|---|
| 2016/0231852 A1* | 8/2016 | Moon | G06F 3/0418 |
| 2017/0115813 A1* | 4/2017 | Chen | G06F 3/0416 |
| 2018/0004333 A1 | 1/2018 | Jeong et al. | |
| 2018/0358413 A1* | 12/2018 | Lee | G06F 3/0443 |

FOREIGN PATENT DOCUMENTS

| | | |
|---|---|---|
| CN | 106814928 A | 6/2017 |
| CN | 108268180 A | 7/2018 |

* cited by examiner

FORCE TOUCH DEVICE, FORCE TOUCH FEEDBACK METHOD, AND TOUCH DISPLAY DEVICE

The present application claims priority of the Chinese Patent Application No. 201810320230.4, filed on Apr. 11, 2018, the disclosure of which is incorporated herein by reference in its entirety as part of the present application.

TECHNICAL FIELD

The present disclosure relates to a force touch device, a force touch feedback method, and a touch display device.

BACKGROUND

Force touch technology is a touch technology that not only recognizes the user's touch operation, but also achieves force degree perception. Simply put, the technology can sense whether the user is performing a "tap" operation or a "press" operation, thereby being able to feed back different actions and functions on different interfaces.

SUMMARY

The present disclosure provides a force touch device, a force touch feedback method and a touch display device. The force touch device includes a first region and a second region, and the force touch device includes: a force detecting electrode in the first region and the second region; a sensing electrode in the first region; an auxiliary electrode in the second region, and the auxiliary electrode and the sensing electrode are on a same side of the force detecting electrode. The sensing electrode and the force detecting electrode are opposite to and insulated from each other to form a first force sensor, the auxiliary electrode and the force detecting electrode are opposite to and insulated from each other to form a second force sensor, and a distance of the auxiliary electrode from the force detecting electrode is greater than a distance of the sensing electrode from the force detecting electrode.

For example, the force touch device further includes: a feedback circuit connected to the force detecting electrode to receive a force signal. The feedback circuit is provided with a first threshold signal corresponding to the first region and a second threshold signal corresponding to the second region, and the feedback circuit is configured to compare the force signal with the first threshold signal or the second threshold signal and generate a touch command according to a comparison result.

For example, the force detecting electrode includes a first electrode in the first region and a second electrode in the second region, and the feedback circuit is connected to the first electrode and the second electrode to receive a force signal detected by the force detecting electrode.

For example, the force touch device further includes: a circuit board on a side of the auxiliary electrode facing the force detecting electrode. The circuit board includes a component, an orthographic projection of the component on the force detecting electrode is within an orthographic projection of the auxiliary electrode on the force detecting electrode.

For example, a sum of thicknesses of the auxiliary electrode and the circuit board which is located in the second region is equal to a thickness of the sensing electrode.

For example, the sensing electrode includes a metal middle frame.

For example, the auxiliary electrode includes a metal cover.

For example, the force touch device further including an isolation layer between the force detecting electrode and the sensing electrode and between the force detecting electrode and the circuit board.

For example, the isolation layer comprises a buffer insulation layer at a side close to the force detecting electrode and a conductive film at a side away from the force detecting electrode.

For example, at least one of the first region and the second region includes at least one sub region.

For example, the auxiliary electrode and the sensing electrode are insulated from each other.

For example, the force detecting electrode includes a plurality of electrode blocks arranged in an array, the feedback circuit is connected to the electrode blocks in the first region and the electrode blocks in the second region to receive a force signal detected by the force detecting electrode.

Another embodiment of the present disclosure provides a force touch feedback method, applied to the above force touch device, and the force touch feedback method includes: setting a first threshold signal corresponding to the first region and a second threshold signal corresponding to the second region; obtaining at least one of a first force signal on the first region and a second force signal on the second region; comparing the obtained first force signal with the first threshold signal, and comparing the obtained second force signal with the second threshold signal, and generating a touch command according to a comparison result.

Another embodiment of the present disclosure provides a touch display device, including a display panel and the above force touch device.

For example, the display panel is on a side of the force detecting electrode away from the sensing electrode, and the display panel and the force touch device are of an integrated structure.

For example, the display panel includes an organic light emitting diode display panel.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

Figure 1:
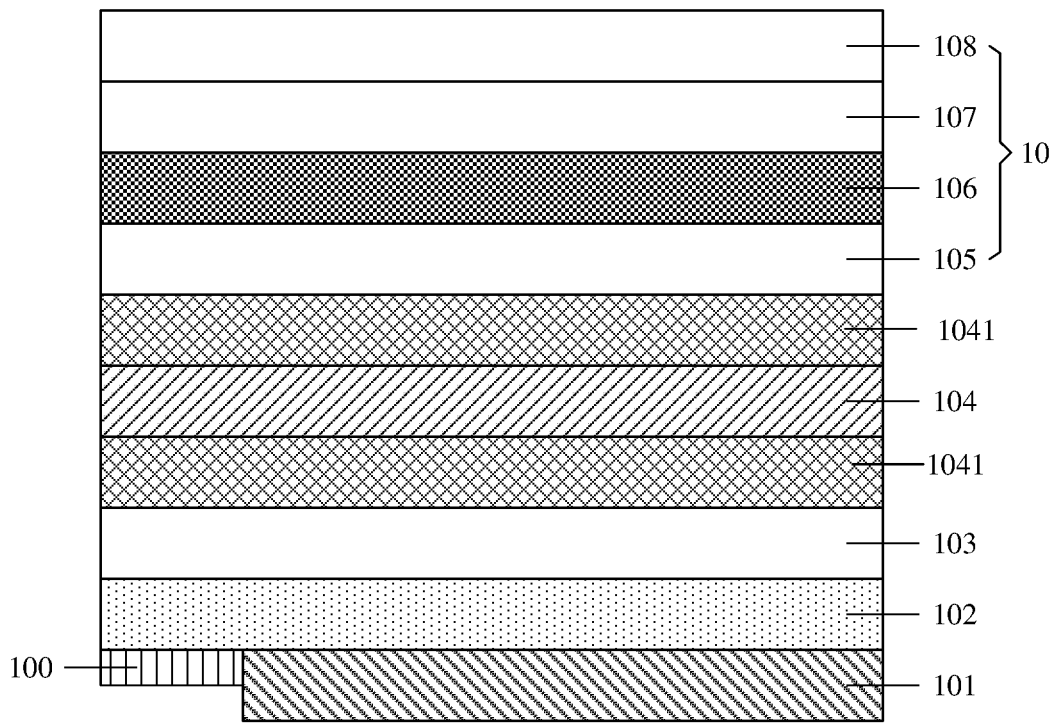
FIG. 1 is a schematic view showing a structure of a touch display device.

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects.

At present, there are a plurality of methods for realizing force touch, such as a resistance force touch and a capacitance force touch. The resistance force touch can sense touch force through force sensing, but it requires high force and has poor sensitivity. The capacitance force touch can sense touch force by changing a value of a capacitance between two electrode plates. When a finger touches an electrode plate, a distance between two electrode plates is changed, thereby causing the capacitance to change, and the change amount of the distance is determined by the magnitude of the force.

The inventors of the present application find that in order to solve the problem of touch uniformity, it is necessary to control two electrode plates to maintain a distance of the two electrode plates identical in an initial state. However, for a display circuit, a distance between the two electrode plates in a region where the flexible printed circuit (FPC) is disposed cannot be ensured to be the same as a distance between the two electrode plates in the other regions, thereby the flexible printed circuit part cannot realize the force touch function, and the user experience and an integrity of the force touch is reduced.

A flexible printed circuit is a printed circuit made of a flexible insulation base material, and the flexible printed circuit has the characteristics of high wiring density, light weight and thin thickness. For example, the flexible printed circuit can be bent, wound or folded, and may be arbitrarily arranged according to a space layout, and can be arbitrarily moved and extended and retracted in a three-dimensional space, thereby achieving integration of component assembly and wire connection. For example, components on the flexible printed circuit may include a transistor, an integrated circuit, a resistor, a capacitor, an inductor or a memory chip (a flash chip).

FIG. 1 is a schematic view showing a partial structure of a touch display device. It can be known from FIG. 1 that the touch display device may include a middle frame 101 and a flexible printed circuit 100 (for example, a position where a portion of the flexible printed circuit provided with a component 109 is located is not provided with the middle frame), a conductive film 102 on a side of the middle frame 101 and the flexible printed circuit 100 (such as a mixed layer of copper and graphite), a buffer layer 103 on a side of the conductive film 102 away from the middle frame 101 and the flexible printed circuit 100, a force detecting electrode 104 on a side of the buffer layer 103 away from the conductive thin film 102, two adhesive layers 1041 respectively on both sides of the force detecting electrode 104, and a base film 105, a pixel unit 106, a two-dimensional touch panel 107 and a cover glass 108 sequentially on a side of the force detecting electrode 104 away from the buffer layer 103.

In the touch display device illustrated in FIG. 1, the force touch function may be realized by using the force detecting electrode 104 as one electrode of a capacitor and the middle frame 101 as the other electrode. A distance between the force detecting electrode 104 and the middle frame 101 is variable, and the force detecting electrode 104 and the middle frame 101 constitute a force sensor.

Figure 2A:
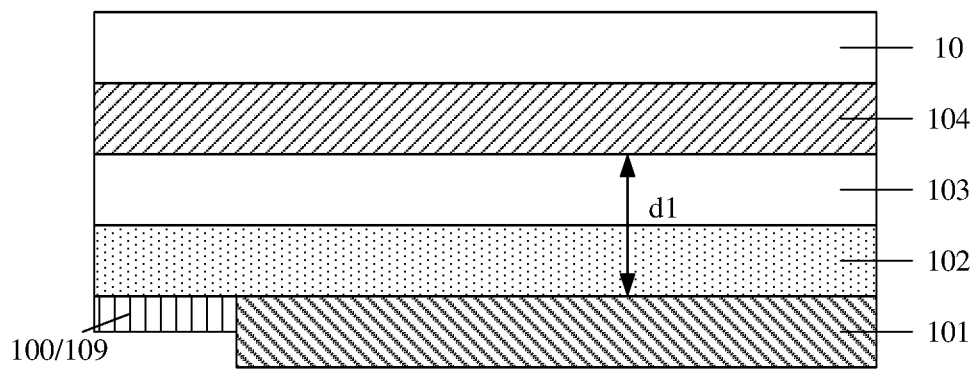
FIGS. 2A and 2B are schematic principle diagrams of a force touch detection.
Figure 2B:
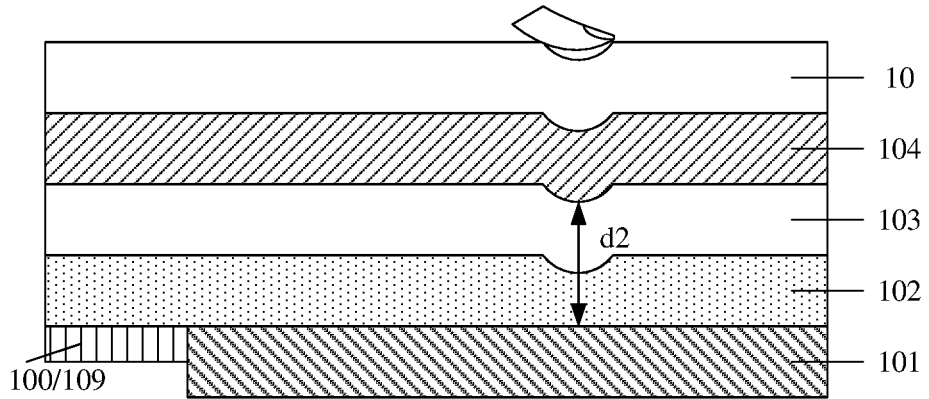

FIGS. 2A and 2B are schematic principle diagrams of the force touch detection. When a finger presses the display panel 10, the distance between the force detecting electrode 104 and the middle frame 101 will change from d1 to d2, thus causing the capacitance generated between the force detecting electrode 104 and the middle frame 101 to change. At this time, the force touch effect can be realized by detecting the change value of the capacitance. FIG. 2B is only a schematic diagram schematically show deformation of each film layer under pressure. For example, in actual products, an air layer may be included between the middle frame 101 and the conductive film 102. During the pressing process, a thickness of the air layer where the pressing position is located is reduced, thus reducing the distance between the two electrodes.

Figure 3:
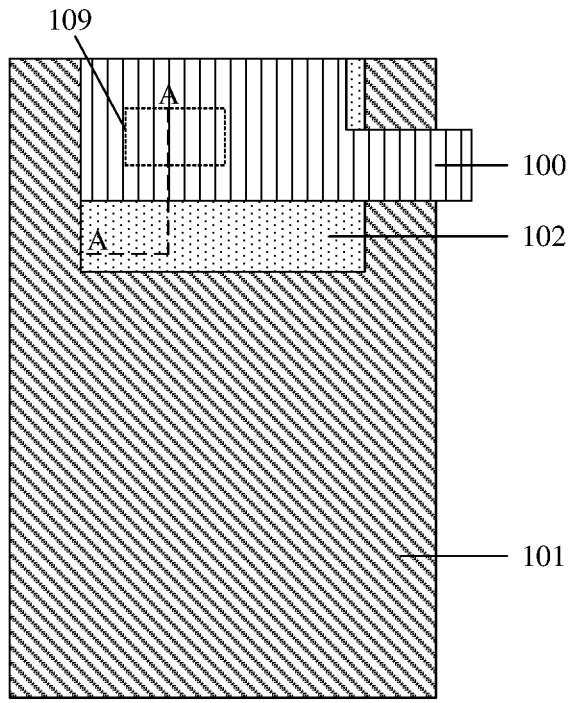
FIG. 3 is a schematic diagram of a plane distribution region of a flexible printed circuit included in a touch display device illustrated in FIGS. 2A and 2B.

FIG. 3 is a schematic diagram of a distribution region of the flexible printed circuit included in the touch display device illustrated in FIGS. 2A and 2B. FIGS. 2A and 2B are schematic cross-section views along line AA in FIG. 3. FIG. 3 only illustrates the flexible printed circuit 100 and the conductive film 102 on the middle frame 101, and other film layers are omitted. FIGS. 2A and 2B illustrate only a portion of the flexible printed circuit 100 provided with the component 109, and do not illustrate a portion of the flexible printed circuit which is relatively thin between the middle frame 101 and the conductive thin film 102. As illustrated in FIG. 3, a portion of a region of the display circuit needs to be configured to be provided with the flexible printed circuit 100, while a height of the component 109 in the flexible printed circuit 100 is different from a height of a structure disposed in other regions. The display circuit cannot realize full-screen force touch if the middle frame is not disposed in a region where the component 109 in the flexible printed circuit 100 is located. However, if the middle frame is disposed in the region where the component 109 is located, because a spacing between the force detecting electrode 104 and the middle frame in the region where the component 109 of the flexible printed circuit 100 is located is inconsistent with a spacing between the force detecting electrode 104 and the middle frame 101 in other regions, the non-uniformity of force touch will be caused.

Figure 4:
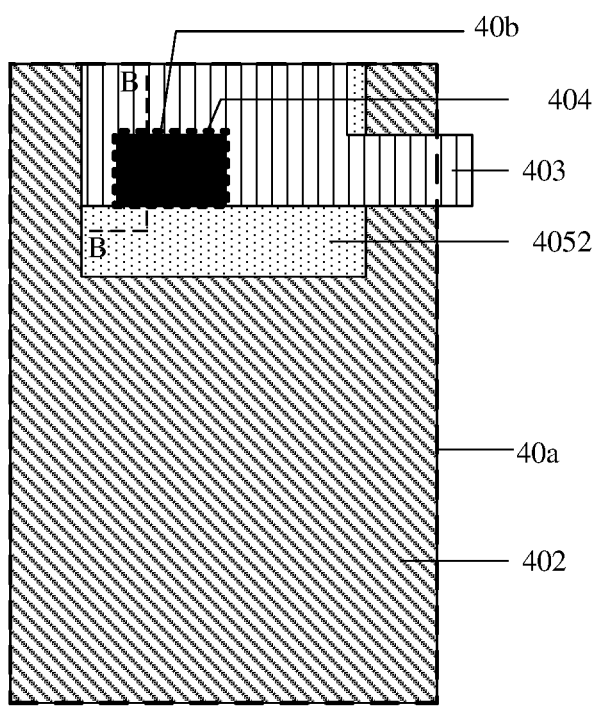
FIG. 4 schematically illustrates a plane distribution diagram of a force touch device in an embodiment of the present disclosure.

An embodiment of the present disclosure provides a force touch device, and FIG. 4 schematically illustrates a plane distribution diagram of the force touch device in an embodiment of the present disclosure. As illustrated in FIG. 4, the force touch device includes a first region 40a and a second region 40b. For example, the second region 40b is a region in which a component of the flexible printed circuit is disposed, and the first region 40a is a region in which the component of the flexible printed circuit is not disposed. That is, the first region 40a includes a region in which the flexible printed circuit is not disposed and a region of a portion of the flexible printed circuit in which the component is not disposed.

Figure 5:
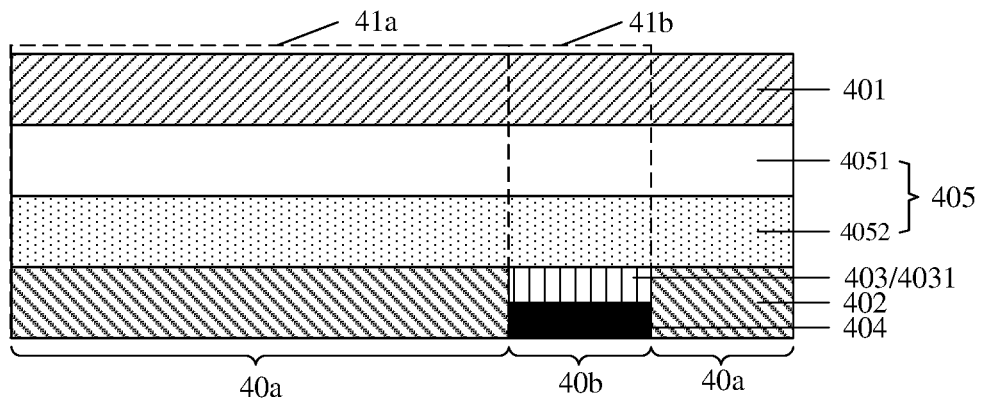
FIG. 5 is a schematic structural diagram of the force touch device along a line BB illustrated in FIG. 4.

FIG. 5 is a schematic structural diagram of the force touch device along line BB illustrated in FIG. 4. FIG. 4 illustrates only the flexible printed circuit and the conductive film on the middle frame, and other film layers are omitted. FIG. 5 illustrates only a portion of the flexible printed circuit provided with a component, and does not illustrate a portion of the flexible printed circuit which is relatively thin between the middle frame and the conductive film. As illustrated in FIGS. 4 and 5, the force touch device may include: the force detecting electrode 401 located in the first region 40a and the second region 40b; a sensing electrode 402 located in the first region 40a and an auxiliary electrode 404 located in the second region 40b. The auxiliary electrode 404 and the sensing electrode 402 are located on a same side of the force detecting electrode 401. The sensing electrode 402 is opposite to the force detecting electrode 401 and insulated from the force detecting electrode 401 to form a first force sensor 41a, the auxiliary electrode 404 is opposite to the force detecting electrode 401 and insulated from the force detecting electrode 401 to form a second force sensor 41b, and a distance of the auxiliary electrode 404 from the force detecting electrode 401 is greater than a distance of the sensing electrode 402 from the force detecting electrode 401. This embodiment of the disclosure can realize full-screen force touch by disposing different force sensors in different regions.

For example, the distance between the sensing electrode 402 and the force detecting electrode 401 is variable to make a capacitance between the sensing electrode 402 and the force detecting electrode 401 variable, so that the force touch can be determined by detecting the change of the capacitance between the sensing electrode 402 and the force detecting electrode 401. Similarly, a distance between the auxiliary electrode 404 and the sensing electrode 402 is also variable.

For example, as illustrated in FIGS. 4 and 5, the auxiliary electrode 404 and the sensing electrode 402 are insulated from each other to prevent signal interference from each other.

For example, as illustrated in FIG. 5, because the distance between the sensing electrode 402 and the force detecting electrode 401 is not equal to the distance between the auxiliary electrode 404 and the force detecting electrode 401, the force touch device provided by the embodiment of the present disclosure further includes a feedback circuit for processing force signals detected in the first region and the second region respectively. For example, the feedback circuit is respectively connected to the force detecting electrode located in the first region and the second region, the feedback circuit is provided with a first threshold signal corresponding to the first region and a second threshold signal corresponding to the second region, and the feedback circuit is configured to receive the force signal detected by the force detecting electrode, and compare the force signal with the first threshold signal or the second threshold signal, and generate a touch command according to the comparison result.

For example, the feedback circuit judges whether the force signal detected by the force detecting electrode located in the first region is greater than the first threshold signal, if so, it indicates that a force touch operation is detected, and then a touch command is generated to perform functions such as human-computer interaction. For example, the first threshold signal may be used to determine whether there is a force touch operation or not, and may also be used to determine what the force touch level is to generate more touch instructions, that is, the corresponding operation may be responded according to the force degree to improve the human-computer interaction function, category and mode of the touch device.

The force touch device provided with the auxiliary electrode and the feedback circuit in the embodiment of the present disclosure not only can realize full-screen force touch, but also can avoid the influence on the accuracy of touch detection caused by different electrode spacing in different regions.

For example, as illustrated in FIGS. 4 and 5, the force touch device further includes a circuit board 403 located on a side of the auxiliary electrode 404 facing the force detecting electrode 401. For example, the circuit board 403 may be a flexible printed circuit. The circuit board 403 includes a component 4031, for example, the component 4031 may include a transistor, an integrated circuit, a resistor, a capacitor, an inductor, a memory chip (a flash chip), etc.

For example, as illustrated in FIGS. 4 and 5, an orthographic projection of the component 4031 on the force detecting electrode 401 is within an orthographic projection of the auxiliary electrode 404 on the force detecting electrode 401. That is, the component 4031 is located in the second region 40b, and the force detecting electrode 401 and the auxiliary electrode 404 are two electrodes for realizing force touch in a region where the component 4031 is located.

For example, as illustrated in FIGS. 4 and 5, the orthographic projection of the auxiliary electrode 404 on the force detecting electrode 401 is not overlapped with the orthographic projection of the sensing electrode 402 on the force detecting electrode 401. That is, the auxiliary electrode 404 is only located in the second region 40b, and the sensing electrode 402 is only located in the first region 40a.

For example, as illustrated in FIGS. 4 and 5, in a plane parallel to the force detecting electrode 401, the first region 40a surrounds the second region 40b. That is, the second region 40b is only a region in which the component 4031 of the circuit board 403 is disposed, and the other regions used for touch are all the first region 40a.

For example, as illustrated in FIGS. 4 and 5, a sum of thicknesses of the circuit board 403 and the auxiliary electrode 404 that are in the second region 40b is equal to a thickness of the sensing electrode 402, thus a surface of the auxiliary electrode 404 on a side away from the force detecting electrode 401 is flush with a surface of the sensing electrode 402 on a side away from the force detecting electrode 401, thereby playing a role of planarization.

For example, as illustrated in FIGS. 4 and 5, the force touch device further includes an isolation layer 405 located between the force detecting electrode 401 and the sensing electrode 402, and between the force detecting electrode 401 and the circuit board 403. The isolation layer 405 has an insulating property and may be configured to prevent crosstalk of signals, which may be specifically a single-layer structure or a multi-layer structure, which is not limited herein.

For example, as illustrated in FIGS. 4 and 5, the isolation layer 405 includes a buffer insulation layer 4051 at a side close to the force detecting electrode 401 and a conductive film 4052 at a side away from the force detecting electrode 401. The buffer insulation layer 4051 may serve as an insulation medium layer between the force detecting electrode 401 and the sensing electrode 402 and between the force detecting electrode 401 and the auxiliary electrode 404.

For example, the sensing electrode 402 may include a metal middle frame, and the auxiliary electrode 404 may include a metal cover.

In the force touch device provided by embodiments of the present disclosure, a sensing electrode 402 is disposed in a region where the component 4031 of the circuit board 403 is not disposed, which is the first region 40a, and an auxiliary electrode 404 is disposed in a region where the component 4031 is disposed, which is the second region 40b. By setting different threshold values for the above two regions, not only a complete full-screen force touch effect can be realized, but also effects such as judging whether force touch operation occurs or determining what the force touch level is can be realized.

Figure 6A:
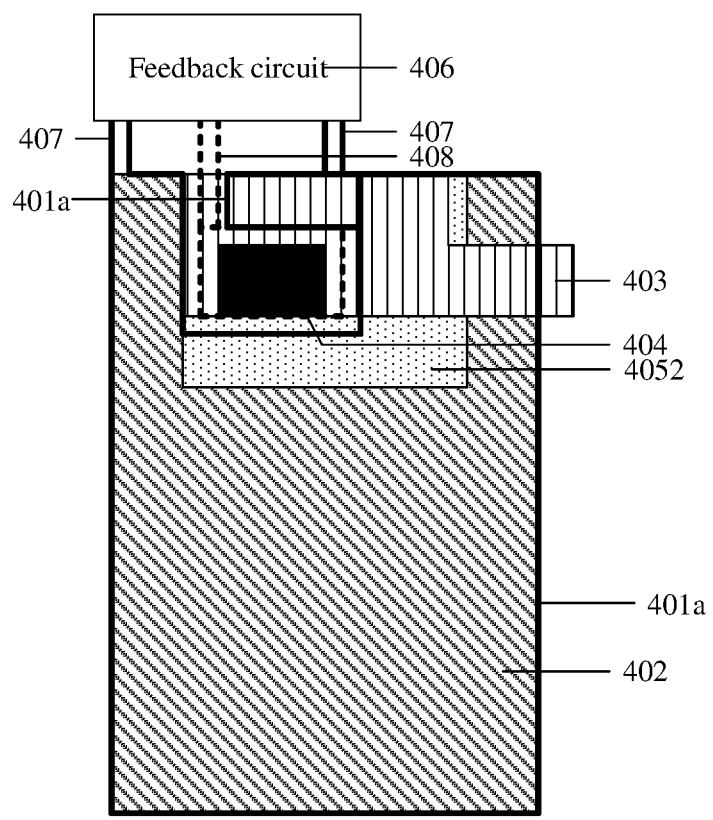
FIG. 6A schematically illustrates a schematic diagram of a line connection relationship of a force touch device in an embodiment of the present disclosure.

For example, FIG. 6A schematically illustrates a schematic diagram of a line connection relationship of a force touch device in an embodiment of the present disclosure. As illustrated in FIG. 6A, the force touch device may further include a first connection line 407 and a second connection line 408, and the feedback circuit 406 may be respectively communicated with the force detecting electrode 401 located in the first region 40a and the force detecting electrode 401 located in the second region 40b through the first connection line 407 and the second connection line 408, to be configured to receive a force signal of each region and perform action feedback according to the received force signal.

For example, the feedback circuit 406 may be, for example, an integrated circuit (IC) chip in which a first threshold signal corresponding to the first region 40a and a second threshold signal corresponding to the second region 40b are set, i.e., different threshold signals are set for different regions respectively.

For example, the feedback circuit 406 may receive the force signal detected by the force detecting electrode 401 in the first region 40a through the first connection line 407 and/or the force signal detected by the force detecting electrode 401 in the second region 40b through the second connection line 408, then compare the force signal in the first region 40a with the first threshold signal and/or compare the force signal in the second region 40b with the second threshold signal, and finally generate a touch command according to the comparison result, to feed back the corresponding action to the corresponding region.

For example, when the force touch device is a mobile phone, it is judged that a force touch operation is generated according to the comparison result, and then the action executed by generating a touch command may be to click on an application on the screen to enter the application.

For example, in this embodiment, the first region 40a may include one or more sub regions 401a in which a component 4031 is not provided, and the second region 40b may also include one or more regions (not shown) in which a component 4031 is provided. For example, all sub regions included in the first region 40a may use the same threshold signal, and all sub regions included in the second region 40b may use a same signal.

Figure 6B:
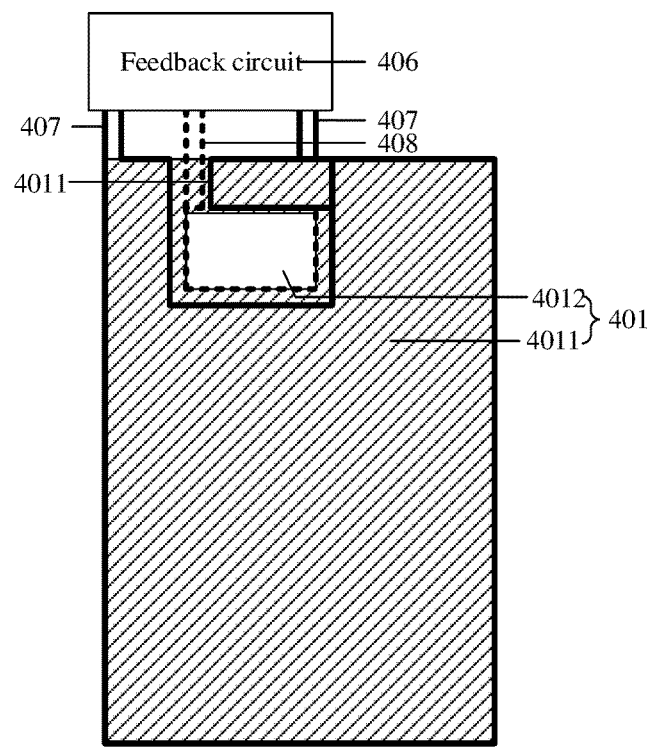
FIG. 6B is a schematic diagram of a force touch device according to an example of an embodiment of the present disclosure.

For example, FIG. 6B is a schematic diagram of a force touch device according to an example of an embodiment of the present disclosure. As illustrated in FIG. 6B, the force detecting electrode 401 includes a first electrode 4011 located in the first region and a second electrode 4012 located in the second region, and the feedback circuit 406 is connected to the first electrode 4011 and the second electrode 4012 to receive a force signal detected by the force detecting electrode 401. The embodiment of the present disclosure solves the problem caused by the uneven thickness between the electrodes of two different force sensors by respectively judging signals of the force detecting electrode located in the first region and the force detecting electrode located in the second region. The touch device in this example may include a two-dimensional touch panel, which may firstly scan a touch position to determine which region the touch position is located in, and then compare the force signal detected in the region with the threshold signal corresponding to the region to obtain a force touch command.

Figure 6C:
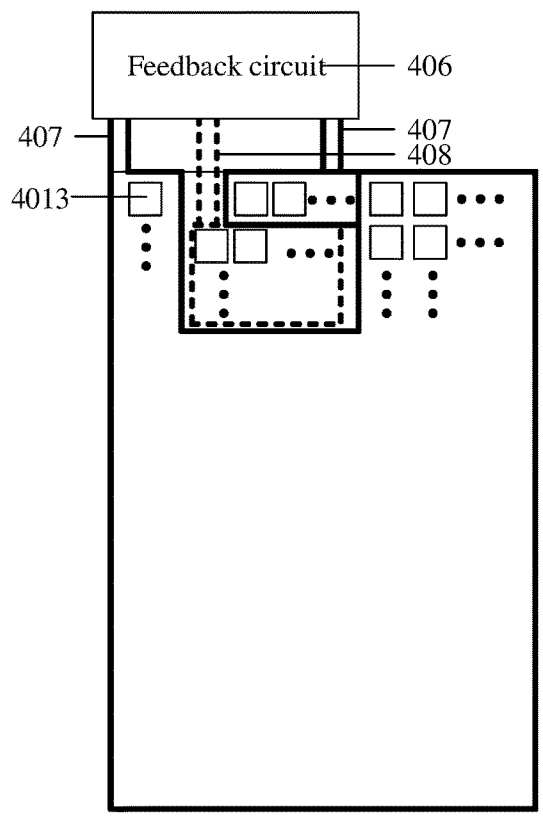
FIG. 6C is a schematic diagram of a force touch device according to another example of an embodiment of the present disclosure.

For example, FIG. 6C is a schematic diagram of a force touch device according to an example of an embodiment of the present disclosure. As illustrated in FIG. 6C, the force detecting electrode 401 includes a plurality of electrode blocks 4013 arranged in an array, and the feedback circuit 406 is connected to the electrode blocks 4013 located in the first region and the electrode blocks 4013 located in the second region to receive a force signal detected by the force detecting electrode 401. The force detecting electrode in this example can realize high precision position detection, so that the touch position can be determined through the force detecting electrode firstly, and then the touch operation is judged through the feedback circuit. In this example, a separate two-dimensional touch panel for scanning the touch position can be omitted, thus reducing the thickness of the touch device.

Figure 7A:
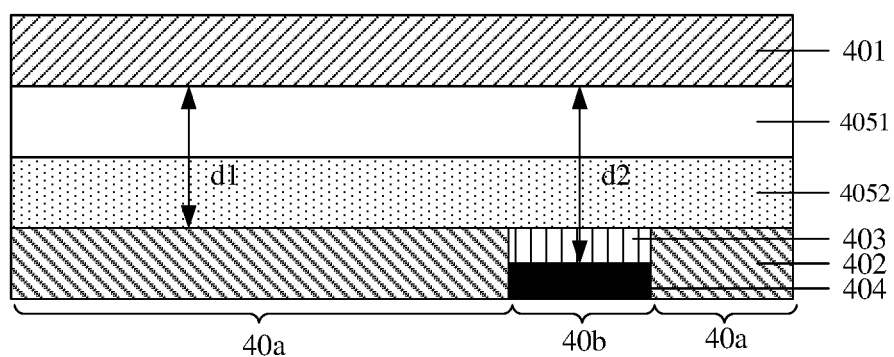
FIGS. 7A and 7B schematically illustrate a working principle diagram of a force touch device in an embodiment of the present disclosure.
Figure 7B:
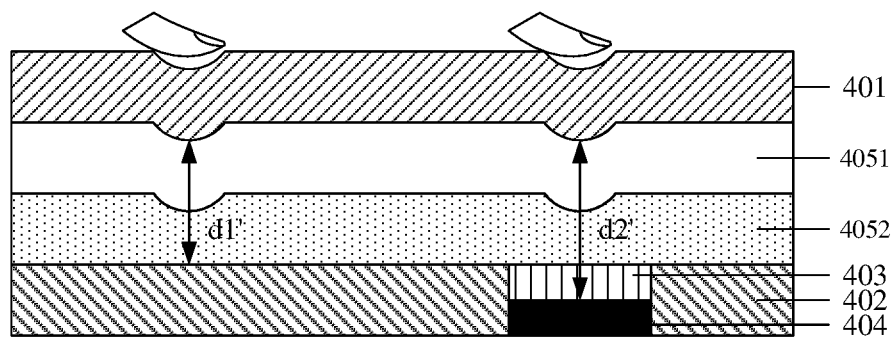

For example, FIGS. 7A and 7B schematically illustrate the working principle diagram of the force touch device in an embodiment of the present disclosure. As illustrated in FIG. 7A, when the touch device is not touched, the distance between the force detecting electrode 401 and the sensing electrode 402 in the first region 40a is d1, and the distance between the force detecting electrode 401 and the auxiliary electrode 404 in the second region 40b is d2. As illustrated in FIG. 7B, when the first region and the second region of the touch device are respectively touched, the distance between the force detecting electrode 401 and the sensing electrode 402 in the first region 40a changes from d1 to d1', and the distance between the force detecting electrode 401 and the auxiliary electrode 404 in the second region 40b changes from d2 to d2'. FIG. 7B is only a schematic diagram schematically illustrating deformation of each film layer under pressure. For example, an air layer may be included between the middle frame and the isolation layer, and in the pressing process, the distance between the middle frame and the force detecting electrode is reduced by reducing the thickness of the air layer where the pressing position is located. Similarly, an air layer may also be included between the auxiliary electrode and the circuit board. In the pressing process, the distance between the auxiliary electrode and the force detecting electrode is reduced by reducing the thickness of the air layer where the pressing position is located.

During the force touch operation, the distance change value between the two electrodes in the first region $40a$ is $\Delta d1=d1-d1'$, the corresponding capacitance change value is $\Delta C1=\varepsilon S/(4\pi k\Delta d1)$, the distance change value between the two electrodes in the second region $40b$ is $\Delta d2=d2-d2'$, and the corresponding capacitance change value is $\Delta C2=\varepsilon S/(4\pi k\Delta d2)$. Because the signal values (e.g., distance change value or capacitance change value) fed back by the two regions are different, the feedback circuit 406 (e.g., IC chip) needs to process the signal values fed back by the two regions separately. For example, the force signal received by the feedback circuit 406 may be a distance change value or a capacitance change value. For example, the first threshold signal and the second threshold signal may be capacitance values. For example, partition processing may be performed according to the first threshold signal corresponding to the first region $40a$ and the second threshold signal corresponding to the second region $40b$.

Figure 8:
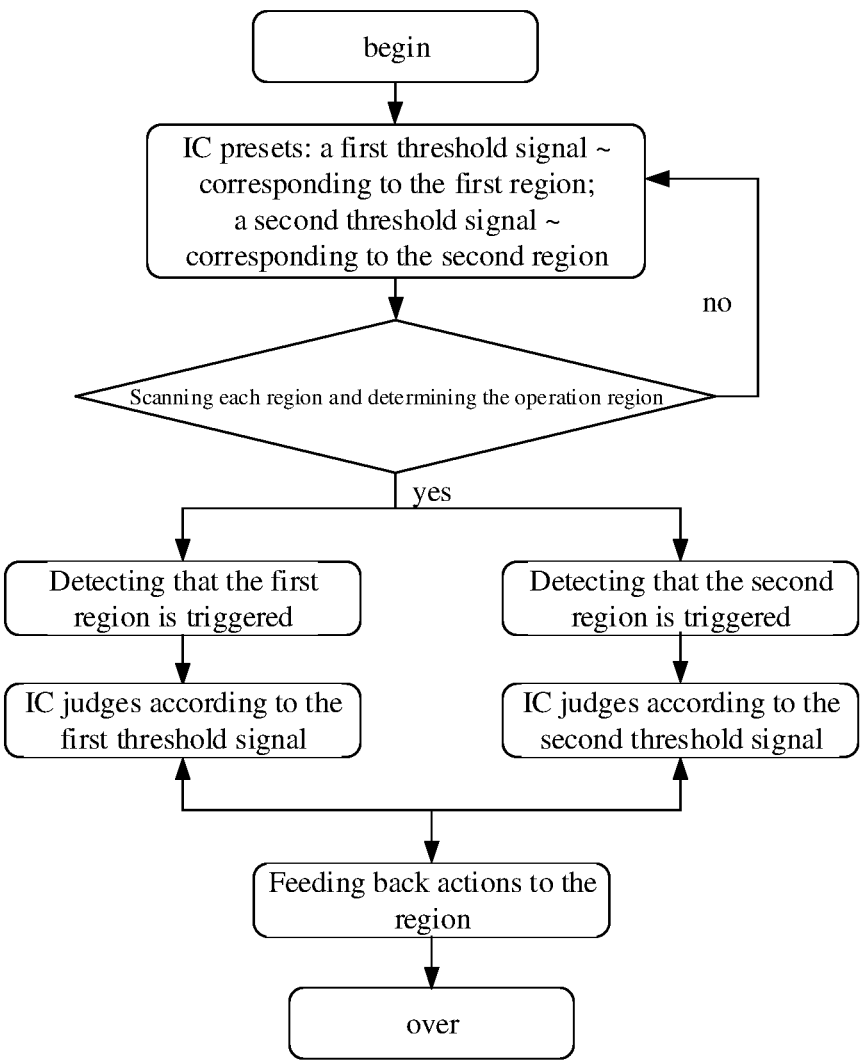
FIG. 8 schematically illustrates a feedback process diagram of force touch in an embodiment of the present disclosure.

FIG. 8 schematically illustrates a feedback process diagram of force touch in an embodiment of the present disclosure. As illustrated in FIG. 8, the processing procedure is as follows: the feedback circuit (e.g., IC chip) presets the first threshold signal corresponding to the first region $40a$ and the second threshold signal corresponding to the second region $40b$ to facilitate the partition processing; scanning each region to determine which region is performing touch operation; then, according to the threshold signal corresponding to the detected operation region, judging the force signal detected in the region, for example, the capacitance change value converted from the above distance change value; finally, generating a touch command according to the judgment result to feed back corresponding actions to the region.

Figure 9:
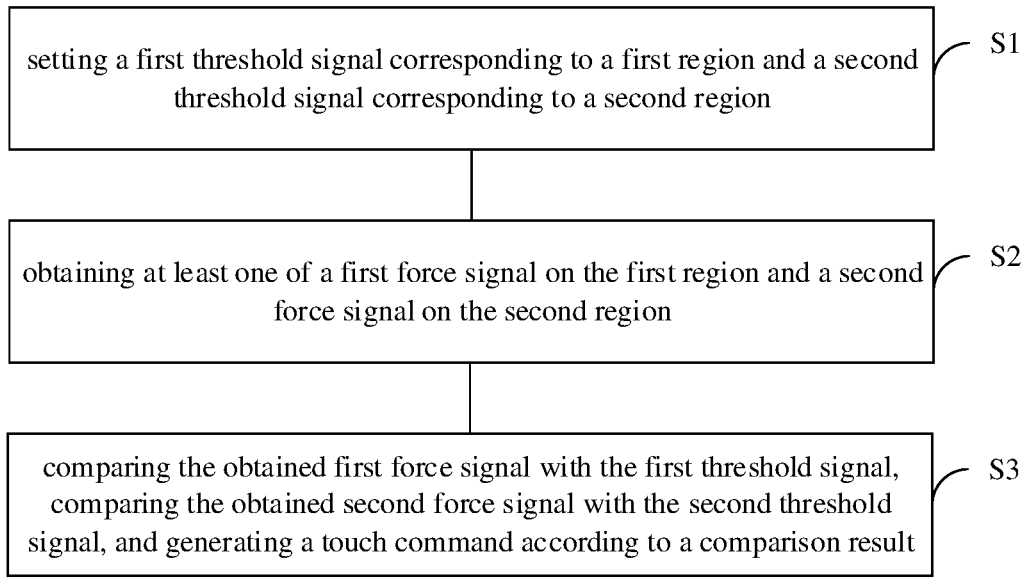
FIG. 9 schematically illustrates a flow chart of a feedback method of force touch in an embodiment of the present disclosure.

FIG. 9 schematically illustrates a flow chart of a feedback method of force touch in an embodiment of the present disclosure. As illustrated in FIG. 9, the feedback method may include:

S1, setting a first threshold signal corresponding to a first region and a second threshold signal corresponding to a second region;

S2, obtaining at least one of a first force signal on the first region and a second force signal on the second region;

S3, comparing the obtained first force signal with the first threshold signal, comparing the obtained second force signal with the second threshold signal, and generating a touch command according to a comparison result.

According to the force touch feedback method provided by an exemplary embodiment of the present disclosure, by setting different threshold signals for a region in which a component of a circuit board is not disposed, i.e., the first region, and a region in which a component of a circuit board is disposed, i.e., the second region, not only a complete full-screen force touch effect can be realized, but also effects such as judging whether force touch operation occurs or what the force touch level is can be realized.

Figure 10:
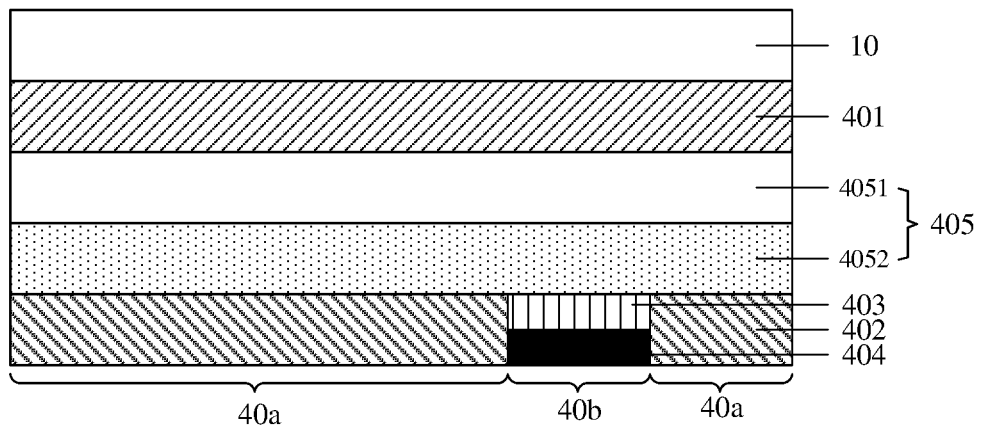
FIG. 10 schematically illustrates a schematic diagram of a touch display device in an embodiment of the present disclosure.

FIG. 10 schematically illustrates a schematic diagram of a touch display device in an embodiment of the present disclosure. As illustrated in FIG. 10, the touch display device includes the above-mentioned force touch device and the display panel 10, and the display panel 10 is located on a side of the force detecting electrode 401 of the force touch device away from the sensing electrode 402. The display panel 10 may include a base film, a pixel unit, a two-dimensional touch panel, a cover glass, and the like as illustrated in FIG. 1. The embodiment is not limited to this, the display panel may also be provided without a two-dimensional touch panel. The touch display device can realize a force touch function at both a position in which a flexible printed circuit is disposed and a position in which a component of a flexible printed circuit is not provided, thus realizing a complete full-screen force touch effect.

In the exemplary embodiment, the display panel 10 and the force touch device may be of an integrated structure. For example, the display panel 10 is directly formed using the force detecting electrode 401 in the force touch device as a base substrate. The display panel 10 may include an organic light emitting diode (OLED) display panel, a polymer light emitting diode (PLED) display panel, or a quantum dot light emitting diode (QLED) display panel.

It should be noted that the display device in this embodiment may include, for example, any product or component having a display function such as a mobile phone, a tablet computer, a television, a notebook computer, a digital photo frame, a navigator, etc.

It should be noted that although several circuits or units of a device for action execution are mentioned in the above detailed description, such division is not mandatory. In fact, according to embodiments of the present disclosure, features and functions of two or more circuits or units described above may be embodied in one circuit or unit. On the contrary, the features and functions of one circuit or unit described above may be embodied by further divided into a plurality of circuits or units.

Furthermore, although the various steps of the method in the present disclosure are described in a specific order in the drawings, this does not require or imply that these steps must be performed in this specific order or that all of the illustrated steps must be performed to achieve the desired results. Additionally or alternatively, certain steps may be omitted, multiple steps may be combined into one step for execution, and/or one step may be decomposed into multiple steps for execution, etc.

Other embodiments of the present disclosure will readily occur to those skilled in the art after considering the specification and practicing the invention disclosed herein. This application is intended to cover any variations, uses or adaptations of the present disclosure, which follow the general principles of the present disclosure and include common knowledge or conventional technical means in the technical field not disclosed in the present disclosure. The specification and examples are to be considered as exemplary only, with the true scope and spirit of the present disclosure being indicated by the claims.

It should be understood that the present disclosure is not limited to the precise structure already described above and illustrated in the drawings, and various modifications and changes may be made without departing from the scope thereof. The scope of the present disclosure is limited only by the attached claims.

The following statements should be noted:

(1) The accompanying drawings involve only the structure(s) in connection with the embodiment(s) of the present disclosure, and other structure(s) can be referred to common design(s).

(2) In case of no conflict, features in one embodiment or in different embodiments can be combined.

The foregoing is merely exemplary embodiments of the present disclosure, but is not used to limit the protection scope of the present disclosure. The protection scope of the present disclosure shall be defined by the attached claims.

What is claimed is:

1. A force touch device including a first region and a second region, comprising:
   a force detecting electrode in the first region and the second region;
   a sensing electrode in the first region;
   an auxiliary electrode in the second region, and the auxiliary electrode and the sensing electrode being on a same side of the force detecting electrode, wherein
   the sensing electrode and the force detecting electrode are disposed oppositely and insulated from each other to form a first force sensor, the auxiliary electrode and the force detecting electrode are disposed oppositely and insulated from each other to form a second force sensor, and a distance between the auxiliary electrode and the force detecting electrode is greater than a distance between the sensing electrode and the force detecting electrode,
   wherein the force touch device further comprises a circuit board on a side of the auxiliary electrode facing the force detecting electrode,
   the circuit board comprises a component, an orthographic projection of the component on the force detecting electrode coincides with an orthographic projection of the auxiliary electrode on the force detecting electrode,
   in a direction perpendicular to the force touch device, the circuit board is disposed between the auxiliary electrode and the force detecting electrode.

2. The force touch device according to claim 1, further comprising:
   a feedback circuit, connected to the force detecting electrode to receive a force signal, wherein
   the feedback circuit is provided with a first threshold signal corresponding to the first region and a second threshold signal corresponding to the second region, and the feedback circuit is configured to compare the force signal with the first threshold signal or the second threshold signal and generate a touch command according to a comparison result.

3. The force touch device according to claim 2, wherein the force detecting electrode comprises a first electrode in the first region and a second electrode in the second region, and the feedback circuit is connected to the first electrode and the second electrode to receive a force signal detected by the force detecting electrode.

4. The force touch device according to claim 1, wherein a sum of thicknesses of the auxiliary electrode and the circuit board which is located in the second region is equal to a thickness of the sensing electrode.

5. The force touch device according to claim 1, wherein the sensing electrode comprises a metal middle frame.

6. The force touch device according to claim 1, wherein the auxiliary electrode comprises a metal cover.

7. The force touch device according to claim 1, further comprising an isolation layer between the force detecting electrode and the sensing electrode and between the force detecting electrode and the circuit board.

8. The force touch device according to claim 7, wherein the isolation layer comprises a buffer insulation layer at a side close to the force detecting electrode and a conductive film at a side away from the force detecting electrode.

9. The force touch device according to claim 1, wherein at least one of the first region and the second region comprises at least one sub region.

10. The force touch device according to claim 1, wherein the auxiliary electrode and the sensing electrode are insulated from each other.

11. The force touch device according to claim 2, wherein the force detecting electrode comprises a plurality of electrode blocks arranged in an array, the feedback circuit is connected to the electrode blocks in the first region and the electrode blocks in the second region to receive a force signal detected by the force detecting electrode.

12. A force touch feedback method, applied to the force touch device according to claim 1, and the force touch feedback method comprises:
    setting a first threshold signal corresponding to the first region and a second threshold signal corresponding to the second region;
    obtaining at least one of a first force signal on the first region and a second force signal on the second region;
    comparing the obtained first force signal with the first threshold signal, and comparing the obtained second force signal with the second threshold signal, and generating a touch command according to a comparison result.

13. A touch display device, comprising a display panel and the force touch device according to claim 1.

14. The touch display device according to claim 13, wherein the display panel is on a side of the force detecting electrode away from the sensing electrode, and the display panel and the force touch device are of an integrated structure.

15. The touch display device according to claim 13, wherein the display panel comprises an organic light emitting diode display panel.

16. The force touch device according to claim 2, further comprising:
    a circuit board on a side of the auxiliary electrode facing the force detecting electrode, wherein
    the circuit board comprises a component, an orthographic projection of the component on the force detecting electrode is within an orthographic projection of the auxiliary electrode on the force detecting electrode.

17. The force touch device according to claim 3, further comprising:
    a circuit board on a side of the auxiliary electrode facing the force detecting electrode, wherein
    the circuit board comprises a component, an orthographic projection of the component on the force detecting electrode is within an orthographic projection of the auxiliary electrode on the force detecting electrode.

18. The force touch device according to claim 2, wherein a sum of thicknesses of the auxiliary electrode and the circuit board which is located in the second region is equal to a thickness of the sensing electrode.

19. The force touch device according to claim 3, wherein a sum of thicknesses of the auxiliary electrode and the circuit board which is located in the second region is equal to a thickness of the sensing electrode.

* * * * *